US 8,320,476 B2

(12) United States Patent
Hidaka

(10) Patent No.: US 8,320,476 B2
(45) Date of Patent: Nov. 27, 2012

(54) COMMUNICATION CONTROL SYSTEM, RADIO COMMUNICATION TERMINAL AND COMMUNICATION CONTROL METHOD

(75) Inventor: Hiroyuki Hidaka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 616 days.

(21) Appl. No.: 12/158,682

(22) PCT Filed: Dec. 21, 2006

(86) PCT No.: PCT/JP2006/325554
§ 371 (c)(1),
(2), (4) Date: Jun. 10, 2009

(87) PCT Pub. No.: WO2007/072930
PCT Pub. Date: Jun. 28, 2007

(65) Prior Publication Data
US 2009/0296835 A1    Dec. 3, 2009

(30) Foreign Application Priority Data
Dec. 22, 2005    (JP) ................................. 2005-369840

(51) Int. Cl.
*H04K 1/10* (2006.01)
(52) U.S. Cl. ........................................ 375/260; 375/295
(58) Field of Classification Search .......... 375/219–222, 375/260; 370/208–210
See application file for complete search history.

(56) References Cited

U.S. PATENT DOCUMENTS

| | | | |
|---|---|---|---|
| 6,195,534 B1 | 2/2001 | Sakoda et al. | |
| 7,545,732 B2 | 6/2009 | Oh et al. | |
| 7,729,308 B2 * | 6/2010 | Taneja | ......................... 370/329 |
| 2004/0081076 A1 * | 4/2004 | Goldstein et al. | .............. 370/208 |
| 2005/0099937 A1 * | 5/2005 | Oh et al. | ......................... 370/207 |
| 2005/0237989 A1 * | 10/2005 | Ahn et al. | ...................... 370/343 |
| 2006/0146749 A1 * | 7/2006 | Lundh et al. | ................... 370/331 |
| 2006/0203724 A1 * | 9/2006 | Ghosh et al. | ................... 370/229 |
| 2006/0246916 A1 * | 11/2006 | Cheng et al. | ................... 455/450 |
| 2007/0060179 A1 * | 3/2007 | Yamauchi et al. | ............ 455/509 |
| 2007/0070908 A1 * | 3/2007 | Ghosh et al. | ................... 370/236 |
| 2007/0140102 A1 * | 6/2007 | Oh et al. | ......................... 370/208 |
| 2009/0201872 A1 * | 8/2009 | Gorokhov et al. | ............. 370/329 |
| 2010/0098181 A1 * | 4/2010 | Jacobsen et al. | .............. 375/260 |

FOREIGN PATENT DOCUMENTS

| | | |
|---|---|---|
| CN | 1218358 A | 6/1999 |
| CN | 1585394 A | 2/2005 |
| JP | 06-189362 | 7/1994 |
| JP | 11-340951 | 12/1999 |
| JP | 2001-168821 | 6/2001 |

(Continued)

OTHER PUBLICATIONS

Japanese language office action dated Feb. 15, 2011 and its English language translation for corresponding Japanese application 2005369840.

(Continued)

*Primary Examiner* — Emmanuel Bayard
(74) *Attorney, Agent, or Firm* — DLA Piper LLP (US)

(57) ABSTRACT

A communication control system according to the present invention transmits and receives multiple data flows having different priorities to and from a radio communication terminal by a multicarrier using multiple carriers. The communication control system is provided with a carrier transmitter configured to transmit the multiple carriers to the radio communication terminal 2; and a carrier assignment unit configured to assign a data flow of a priority, which is different from that of a different data flow, a carrier different from that of the different data flow on the basis of the priorities of the respective data flows.

20 Claims, 9 Drawing Sheets

FOREIGN PATENT DOCUMENTS

| | | |
|---|---|---|
| JP | 2002-300644 | 10/2002 |
| JP | 2005-020076 | 1/2005 |

OTHER PUBLICATIONS

Chinese language office action dated Dec. 31, 2010 and its English language translation for corresponding Chinese application 200680048869.7.

Japanese language office action dated Jul. 19, 2011 and its English language translation for corresponding Japanese application 2005369840.

Chinese language office action dated Feb. 16, 2012 and its English translation for corresponding Chinese application 200680048869.7

\* cited by examiner

FIG. 8
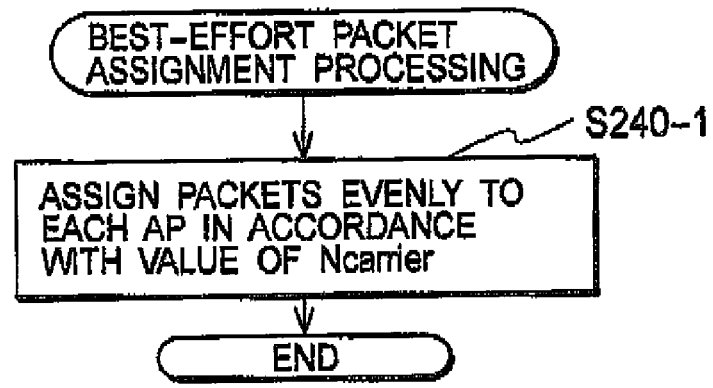
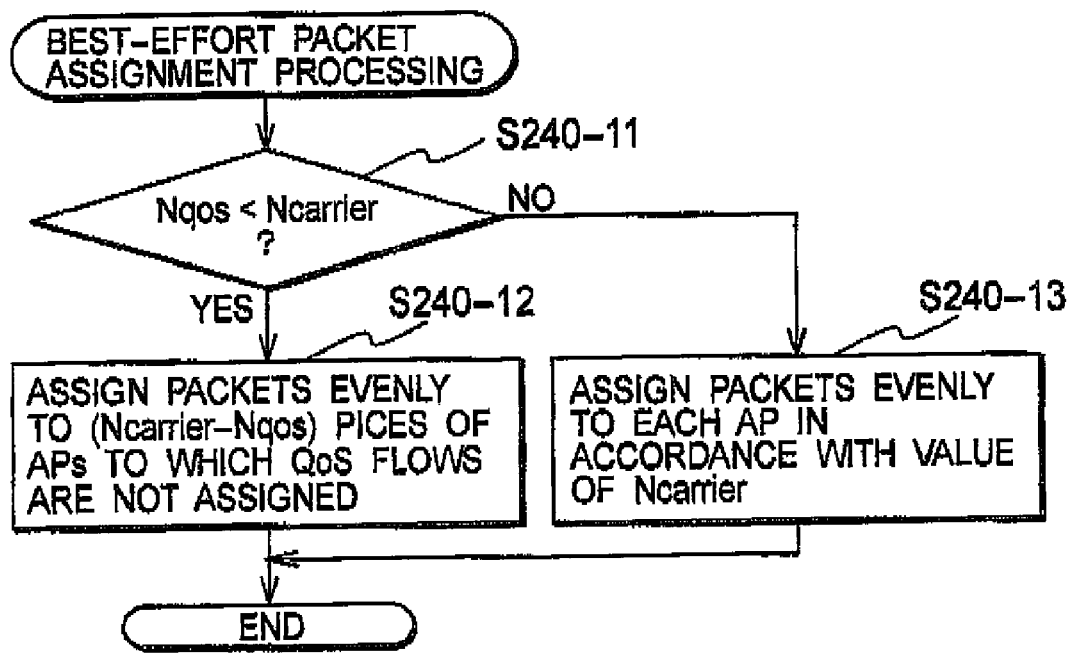

FIG. 10

| TYPES | PRIORITY |
|---|---|
| VOICE | 0 x 04 |
| STREAMING | 0 x 03 |
| GAME | 0 x 02 |
| OTHER | 0 x 01 |

US 8,320,476 B2

COMMUNICATION CONTROL SYSTEM, RADIO COMMUNICATION TERMINAL AND COMMUNICATION CONTROL METHOD

TECHNICAL FIELD

The present invention relates to a communication control system, a radio communication terminal and a communication control method that are applied to communications by a multicarrier using multiple carriers.

BACKGROUND ART

In a mobile communication system using code division multiple access (CDMA), 1×EV-DO (1×evolution-data only) achieving high speed data communications is provided (Japanese Patent Application Publication No. 2002-300644 (pages 2-3 and FIG. 1), for example).

In 1×EV-DO, a single carrier is assigned to a single user (radio communication terminal). Furthermore, the implementation of a so-called "multicarrier" (n×EV-DO) has been in consideration, the multicarrier achieving even higher speed data communications by assigning multiple carriers (three carriers, for example) to a single user.

In addition, in 1×EV-DO Rev. A, priority control (QoS control) can be performed for each of data flows of voice data (VoIP), file transfer or the like in order to appropriately handle the data flows.

Moreover, in a case of the multicarrier, a data flow transmitted using a logical channel is subjected to serial-parallel conversion (S/P conversion) in a physical layer, and is assigned to multiple carriers.

DISCLOSURE OF THE INVENTION

In a case where the aforementioned priority control is applied to n×EV-DO, there is a problem that transmission of all the data of different priorities is interrupted if a trouble is occurs in a part of carriers constituting the multicarrier since the data flow is spread to multiple carriers.

In other words, the problem is that although other carriers are in normal condition, the transmission of all the data is interrupted until the trouble is recovered.

In this respect, the present invention is made in view of the aforementioned situation. An object of the present invention is to provide a communication control system, a radio communication terminal and a communication control method that are capable of surely executing QoS control and also avoiding interruption of transmission of all the data even if a trouble occurs in a part of carriers in a case where multiple data of different priorities are transmitted by a multicarrier.

In order to solve the aforementioned problem, the present invention includes the following features. To being with, a first aspect of the present invention is summarized as a communication control system (communication control system 100) configured to transmit and receive a plurality of data flows (QoS flows F1 and F2) having different priorities (flow priorities) to and from a radio communication terminal (radio to communication terminal 210) by a multicarrier using a plurality of carriers (carriers C1 to C3), comprising: a carrier transmitter (radio transmission and reception unit 111) configured to transmit the carriers to the radio communication terminal; and a carrier assignment unit (carrier assignment unit 127) configured to assign a data flow (QoS flow F1) having a priority different from other data flows, a carrier (carrier C1, for example) different from the other data flows (QoS flow F2) on the basis of the priorities of the respective data flows.

According to such communication control system, a carrier different from other data flows is assigned to a data flow having a priority different from the other data flows on the basis of the priorities of the respective data flows.

Thus, it is possible to avoid the interruption of all the data transmission even if a trouble occurs in a part of carriers constituting the multicarrier. In addition, since different carriers are respectively assigned to the data flows having different priorities, priority control of the data flows in accordance with the priorities can be more surely and easily achieved.

A second aspect of the present invention is summarized as the communication control system according to the first aspect of the invention, further comprising: a carrier receiver (radio transmission and reception unit 111) configured to receive the carriers from the radio communication terminal; and a communication quality measurement unit (communication quality measurement unit 125) configured to measure a communication quality of the carriers received by the carrier receiver, wherein the carrier assignment unit determines the carrier to be assigned to the data flow on the basis of the communication quality measured by the communication quality measurement unit.

A third aspect of the present invention is summarized as the communication control system according to the second aspect of the invention, wherein the carrier assignment unit assigns a carrier having the best communication quality measured by the communication quality measurement unit (carrier C1, for example) to a data flow having the highest priority (QoS flow F1).

A fourth aspect of the present invention is summarized as the communication control system according to the second aspect of the invention, wherein the communication quality is a transmission delay time of the data flow, and the carrier assignment unit determines the carrier to be assigned to the data flow on the basis of the transmission delay time measured by the communication quality measurement unit.

A fifth aspect of the present invention is summarized as the communication control system according to the second aspect of the invention, wherein the communication quality is an error rate of the data flow, and the carrier assignment unit id determines the carrier to be assigned to the data flow on the basis of the error rate measured by the communication quality measurement unit.

A sixth aspect of the present invention is summarized as the communication control system according to one of the first to fifth aspects of the invention, wherein when receiving a new communication quality reported by the communication quality measurement unit after assigning the carrier to the data flow, the carrier assignment unit determines the carrier to be assigned to the data flow again on the basis of the new communication quality.

A seventh aspect of the present invention is summarized as the communication control system according to one of the first to fifth aspects of the inventions wherein the carrier assignment unit determines the carrier to be assigned to the data flow again when a handoff of the radio communication terminal is executed after the carrier is assigned to the data flow.

An eighth aspect of the present invention is summarized as the communication control system according to one of the first to fifth aspects of the invention, wherein the carrier assignment unit determines the carrier to be assigned to the data flow again when the number of carriers used between itself and the radio communication terminal changes after the carrier is assigned to the data flow.

An ninth aspect of the present invention is summarized as the communication control system according to one of the first to fifth aspects of the invention, wherein the carrier assignment unit determines the carrier to be assigned to the data flow again when the number of data flows transmitted and received between itself and the radio communication terminal changes after the carrier is assigned to the data flow.

A tenth aspect of the present invention is summarized as a radio communication terminal (radio communication terminal 210) configured to transmit and receive a plurality of data flows having different priorities to and from a radio base station by a multicarrier using a plurality of carriers, comprising: a carrier transmitter (radio transmission and reception unit 211) configured to transmit the carriers to the radio base station; and a carrier assignment unit (carrier assignment unit 219) configured to assign a data flow (QoS flow F1) having a priority different from other data flows, a carrier (carrier C1, for example) different from the other data flows (QoS flow F2) on the basis of the priorities of the respective data flows.

An eleventh aspect of the present invention is summarized as the radio communication terminal according to the tenth aspect, further comprising: a carrier receiver (radio transmission and reception unit 211) configured to receive the carriers from the radio communication terminal; and a communication quality measurement unit (communication quality measurement unit 217) configured to measure a communication quality of the carriers received by the carrier receiver, wherein the carrier assignment unit determines the carrier to be assigned to the data flow on the basis of the communication is quality measured by the communication quality measurement unit.

A twelfth aspect of the present invention is summarized as the radio communication terminal according to the eleventh aspect, the carrier assignment unit assigns a carrier having the best communication quality measured by the communication quality measurement unit to a data flow having the highest priority.

A thirteen aspect of the present invention is summarized as the radio communication terminal according to the eleventh aspect, wherein the communication quality is a transmission delay time of the data flow, and the carrier assignment unit determines the carrier to be assigned to the data flow on the basis of the transmission delay time measured by the communication quality measurement unit.

A fourteenth aspect of the present invention is summarized as the radio communication terminal according to the eleventh aspect, wherein the communication quality is an error rate of the data flow, and the carrier assignment unit determines the carrier to be assigned to the data flow on the basis of the error rate measured by the communication quality to measurement unit.

A fifteenth aspect of the present invention is summarized as the radio communication terminal according to one of the eleventh to fourteenth aspects, wherein when receiving a new is communication quality reported by the communication quality measurement unit after assigning the carrier to the data flow, the carrier assignment unit determines the carrier to be assigned to the data flow again on the basis of the new communication quality.

A sixteenth aspect of the present invention is summarized as the radio communication terminal according to one of the tenth to fourteenth aspects, wherein the carrier assignment unit determines the carrier to be assigned to the data flow again when a handoff of the radio communication terminal is executed after the carrier is assigned to the data flow.

A seventeenth aspect of the present invention is summarized as the radio communication terminal according to one of the tenth to fourteenth aspects, wherein the carrier assignment unit determines the carrier to be assigned to the data flow again when the number of carriers used between itself and the radio communication terminal changes after the carrier is assigned to the data flow.

An eighteenth aspect of the present invention is summarized as the radio communication terminal according to one of the tenth to fourteenth aspects, wherein the carrier assignment unit determines the carrier to be assigned to the data flow again when the number of data flows transmitted and received between itself and the radio communication terminal changes after the carrier is assigned to the data flow.

A nineteenth aspect of the present invention is summarized as a communication control method for controlling transmission and reception of a plurality of data flows having different priorities by a multicarrier using a plurality of carriers, comprising the steps of: assigning a data flow having a priority different from other data flows, a carrier different from the other data flows on the basis of the priorities of the respective data flows (S110-S240); and transmitting the carriers to a radio communication terminal (S310).

According to an aspect of the present invention, it is possible to provide a communication control system, a radio communication terminal and a communication control method that are capable of surely executing QoS control and also avoiding the interruption of all the data transmission even if a trouble occurs in a part of carriers in a case where multiple data having different priorities are transmitted by a multicarrier.

BRIEF DESCRIPTION OF THE DRAWINGS

FIG. 6 is a diagram showing a processing flow of best-effort packet assignment according to the embodiment of the present invention.

FIG. 10 is a diagram showing an example of flow priorities according to the embodiment of the present invention.

BEST MODE FOR CARRYING OUT THE INVENTION

Figure 1:
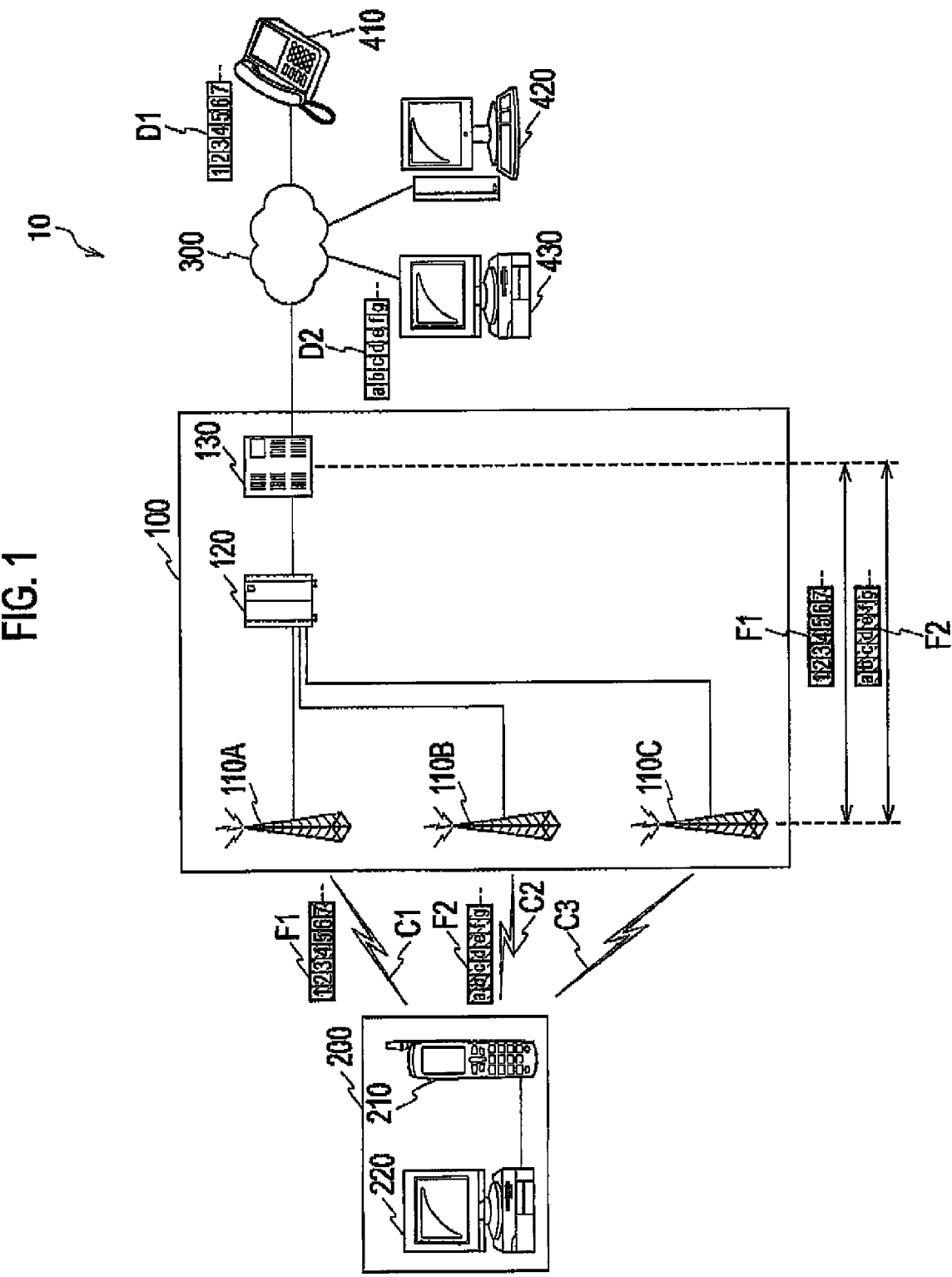
FIG. 1 is a schematic configuration diagram of a communication network including a communication control system and a radio communication terminal according to an embodiment of the present invention.

Next, an embodiment of the present invention will be is described. Note that same or similar reference numerals are given to denote same or similar portions in the descriptions of the drawings, hereinafter. However, the drawings are only schematically shown, and proportions of sizes and the like are different from actual ones, however.

Accordingly, the specific sizes and the like should be judged by referring to the descriptions below. Furthermore, as a matter of course, there are included portions where relationships or proportions of sizes of the drawings are different with respect to one another.

(Schematic Configuration of Communication Network)

FIG. 1 is a schematic configuration diagram of a communication network 10 including a communication control system and a radio communication terminal according to the present embodiment A communication control system 100 and an access terminal device 200 provide high speed data communications (n×EV-DO) by a multicarrier. Specifically, the communication control system 100 and the access terminal device 200 are capable of transmitting and receiving multiple data flows having different priorities (hereinafter, referred to as "QoS flows" in this embodiment) by a multicarrier using a plurality of carriers.

The communication control system 100 is configured of access points 110A to 110C, a BTS/PCF 120 and a PDSN 130, The access points 110A to 110C are radio base stations transmitting and receiving carriers (carriers C1 to C3) of predetermined frequencies (2 GHz band, for example). For example, the access point 110A transmits and receives the carrier C1. Specifically, communications by a multicarrier using three carriers (3×) are executed in the communication control system 100.

Furthermore, the access points 110A to 110C transmit and receive the multiple QoS flows, specifically, a QoS flow F1 and a QoS flow F2 to and from the BTS/PCF 120.

The BTS/PCF 120 (base transceiver station/packet control function) manages the access points 110A to 110C and executes the processing of a QoS flow setting and the like.

The PDSN 130 (packet data servicing node) acts as a gateway s to an IP network 300. The PDSN 130 relays the QoS flow transmitted via the communication control system 100 and also monitors the amount of data (traffic) or the like included in the QoS flow.

The access terminal device 200 is configured of a radio communication terminal 210 and a user terminal 220.

The radio communication terminal 210 is a radio communication terminal supporting communications by a multicarrier. In addition, the radio communication terminal 210 is capable of processing multiple QoS flows having different priorities.

The user terminal 220 is connected to the radio communication terminal 210 and executes file transfer, playback of streaming data, and the like. a personal computer or a PDA can be used as the user terminal 220.

The IP network 300 is a communication network that relays IP packets. The IP network 300 may include the Internet.

An IP phone terminal 410 is connected to the IP network 300 and transmits and receives voice data DI packetized by use of VoIP (voice over IP). The voice data D1 is treated as the QoS flow F1 in the communication control system 100 and is transmitted by the carrier C1.

A web server 420 is connected to the SP network 300 and provides an HTML document, streaming data or the like.

An FTP server 430 is connected to the IP network 300 and transmits file data D2 in accordance with FTP (file transfer to protocol) to the user terminal 220. The file data D2 is treated as the QoS flow F2 in the communication control system 100 and is transmitted by the carrier C2.

(Functional Block Configuration)

Figure 2:
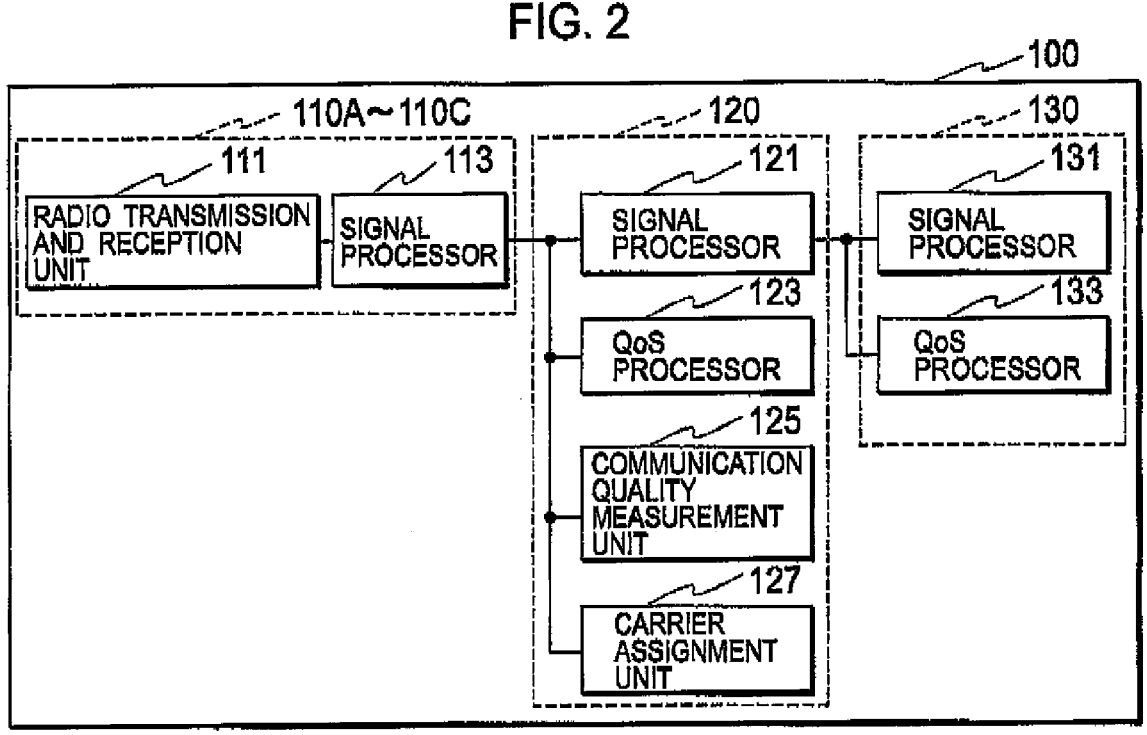
FIG. 2 is a functional block configuration diagram of the communication control system according to the embodiment of the present invention.
Figure 3:
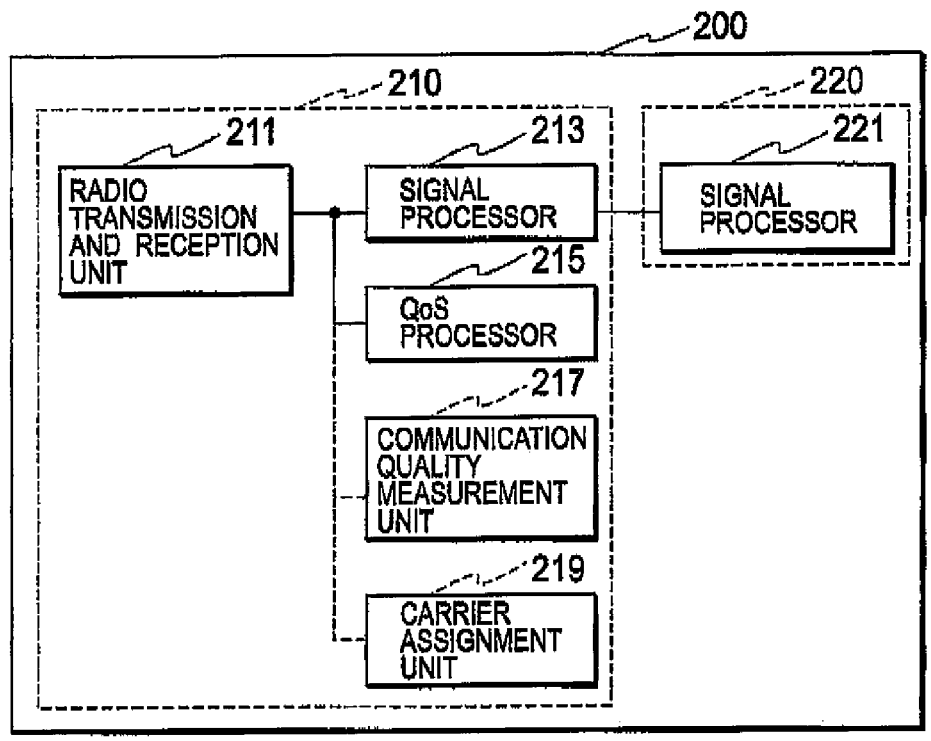
FIG. 3 is a functional block configuration diagram of an access terminal device according to the embodiment of the present invention.

FIG. 2 is a functional block configuration diagram of the communication control system 100. Moreover, FIG. 3 is a functional block configuration diagram of the access terminal device 200.

Note that hereinafter, descriptions will be mainly given of portions related to the present invention. It should be thus noted that there is a case where the communication control system 100 and the access terminal device 200 are provided with an essential block (such as a power supply unit) other than blocks to be described.

(1) Communication Control System 100

As shown in FIG. 2, the communication control system 100 is configured of the access points 110A to 110C, the BTS/PCF 120 and the RDSN 130.

(1.1) Access Points 110A to 110C

Each of the access points 110A to 110C is provided with a radio transmission and reception unit 111 and a signal processor 113.

The radio transmission and reception unit 111 transmits a carrier of a predetermined frequency to the access terminal device 200. In addition, the radio transmission and reception unit 111 receives a carrier transmitted by the access terminal device 200.

In this embodiment, a carrier transmitter that transmits multiple carriers to the access terminal device 200 (specifically, the radio communication terminal 210) is configured by the radio transmission and reception units 111 of the access points 110A to 110C. Moreover, a carrier receiver that receives multiple carriers from the access terminal device 200 is configured by the radio transmission and reception units 111 of the access points 110A to 110C.

Furthermore, the radio transmission and reception unit 111 transmits and receives a base band signal to and from the signal processor 113 and executes digital modulation (and demodulation) processing of the base band signal.

The signal processor 113 executes the processing off a base band signal. In particular, the signal processor 113 relays multiple QoS flows (the QoS flows F1 and F2) included in the base band signal in this embodiment.

Moreover, the signal processor 113 notifies the BTS/PCF 120 of information (such as a signal strength) indicating a receiving condition of a carrier received by the radio transmission and reception unit 111.

(1.2) BTS/PCF 120

The BTS/PCT 120 is provided with a signal processor 121, a QoS processor 123, a communication quality measurement unit 125 and a carrier assignment unit 127.

The signal processor 121 executes processing of a communication session that is set via the access points 110A to 110C, or the like. In addition, the signal processor 121 is also relays multiple QoS flows transmitted and received by the access terminal device 200.

The QoS processor 123 executes a process related to priority control for QoS flow relayed by the signal processor 121. Specifically, the QoS processor 123 executes the priority control for a QoS flow by use of a "flow priority" indicating a priority for each QoS flow and an "AP priority" indicating a priority for each access point (AP).

The flow priority is notified to the BTS/PCF 120 and the PDSN 130 from the access terminal device 200 when the access terminal device 200 starts communications.

In this embodiment, four levels of flow priority shown in FIG. 10 are set. Specifically, the flow priority of the QoS flow F1 including the voice data D1 is set at "04" (the highest). In addition, the flow priority of the QoS flow F2 including the file data D2 is set at "01" (the lowest).

The AP priority is determined in accordance with a communication quality of a carrier received by the access points 110A to 110C. The specific method of determining AP priorities will be described later.

The communication quality measurement unit 125 measures a communication quality of a carrier received by the radio transmission and reception unit 111 of each of the access points 110A to 110C. Specifically, the communication quality measurement unit 125 measures a communication quality of each of the carriers received by the access points 110A to 110C on the basis of the information (such as a signal strength) indicating a receiving condition of the carrier notified by the signal processor 113.

Moreover, the communication quality measurement unit 125 is capable of measuring an error rate of a packet included in a QoS flow or a transmission delay time by monitoring the QoS flow relayed by the signal processor 121.

The carrier assignment unit 127 assigns a carrier to the QoS flow relayed by the signal processor 121. Specifically, on the basis of a flow priority of each QoS flow, the carrier assignment unit 127 assigns a data flow of a priority, which is different from that of a different data flow, a carrier different from that of the different data flow on the basis of the priorities of the respective data flows.

For example, the carrier assignment unit 127 assigns a carrier different from that of the QoS flow F2 (carrier C1, for example) to the QoS flow P1 of a different priority from that of the QoS flow F2 on the basis of the flow priorities of the QoS flow F1 and the QoS flow F2.

In this embodiment, the carrier assignment unit 127 is allowed to determine a carrier to be assigned to a QoS flow on the basis of a communication quality (signal strength, for example) measured by the communication quality measurement unit 125. Incidentally, descriptions of the specific method of determining a carrier and its determination timing based on a communication quality will be given later.

Furthermore, the carrier assignment unit 127 is allowed to assign a carrier having the best communication quality measured by the communication quality measurement unit 125 to the QoS flow F1 of the highest flow priority.

(1.3) PDSN 130

The PDSN 130 is provided with a signal processor 131 and a QoS processor 133.

The signal processor 131 relays multiple QoS flows transmitted and received by the access terminal device 200. In addition, the signal processor 131 monitors the amount of data (traffic) included in the QoS flow to be relayed, or the like.

The QoS processor 133 executes a process related to QoS flow setting or priority control on the basis of the flow priority of the QoS flow.

(2) Access Terminal Device 200

As shown in FIG. 3, the access terminal device 200 is configured of the radio communication terminal 210 and the user terminal 220.

(2.1) Radio Communication Terminal 210

The radio communication terminal 210 is provided with a radio transmission and reception unit 211, a signal processor 213 and a QoS processor 215.

The radio transmission and reception unit 211 transmits carriers of predetermined frequencies to the access points 110A to 110C. In addition, the radio transmission and reception unit 211 receives carriers transmitted from the access points 110A to 110C. Specifically, the radio transmission and reception unit 211 transmits and receives three carriers (carriers C1 to C3) in this embodiment.

In addition, the radio transmission and reception unit 211 transmits and receives a base band signal to and from the signal processor 213 and executes digital modulation (demodulation) processing of the base band signal.

The signal processor 213 executes the processing of a base band signal. In particular, the signal processor 213 executes processing of the QoS flow F1 included in the base band signal in this embodiment.

Specifically, the signal processor 213 executes processing of the voice data D1 included in the QoS flow F1 and then provides a voice call function. Moreover, the signal processor 213 relays the QoS flow F2 included in a base band signal.

The QoS processor 215 executes a process related to priority control of a QoS flow relayed by the signal processor 213. Specifically, the QoS processor 215 executes priority control of a QoS flow by use of a flow priority and an AP priority in a similar manner to that of the aforementioned QoS processor 123.

(2.2) User Terminal 220

The user terminal 220 is provided with a signal processor 221 as a functional block related to the present embodiment.

The signal processor 221 acquires file data D2 in accordance with FTP, the file data D2 being included in the QoS flow F2 relayed by the signal processor 213.

(Operations of Communication Control System and Radio Communication Terminal)

Next, operations of the communication control system and the radio communication terminal according to the present embodiment will be described. Specifically, descriptions will be given of an operation for assigning carriers to the QoS flow a F1 and the QoS flow F2 of different priorities, the operation being performed by use of the communication control system 100 and the radio communication terminal 210.

(1) QoS Flow Connection Sequence

Figure 4:
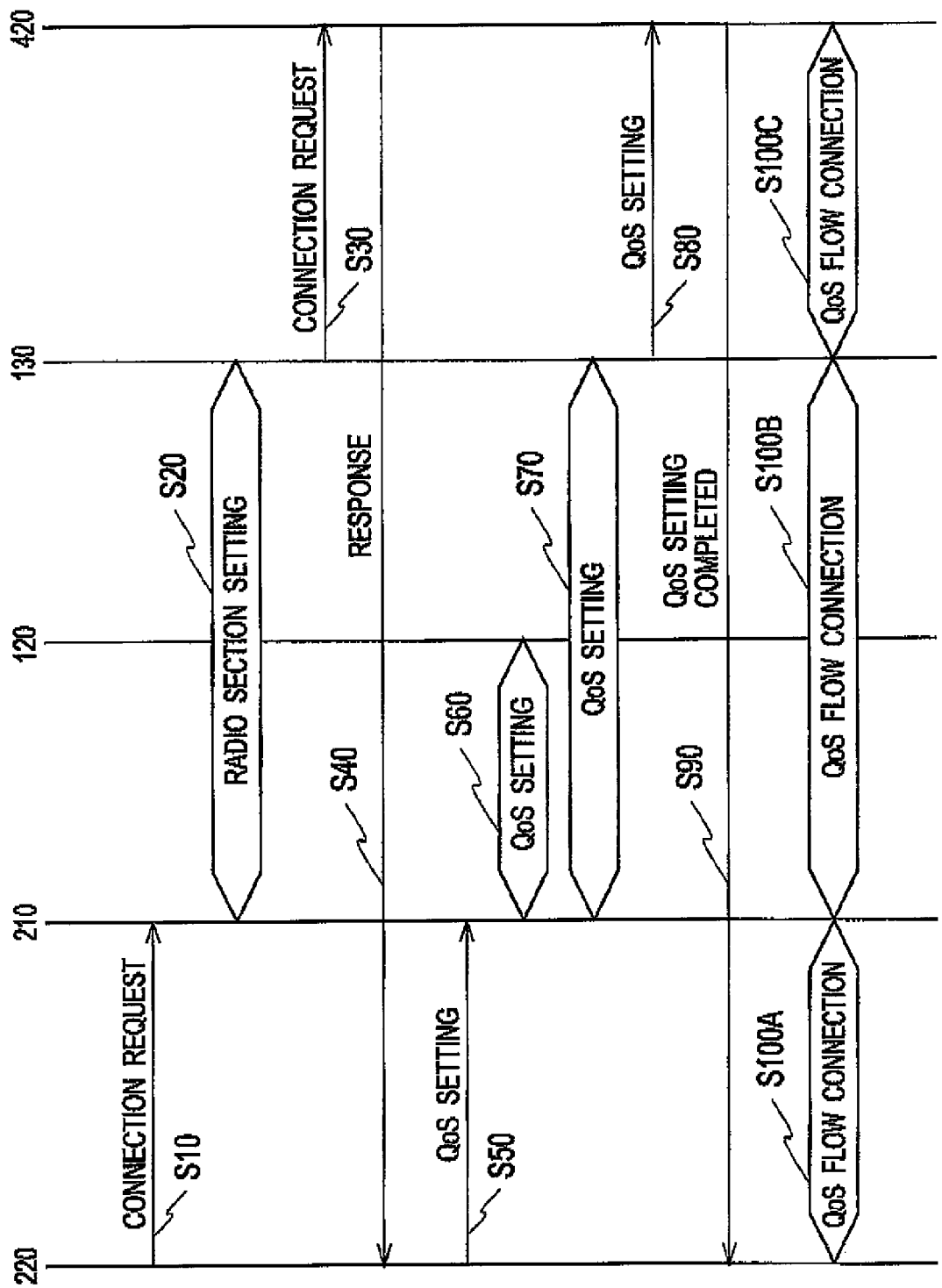
FIG. 4 is a connection sequence diagram of a QoS flow (data flow) according to the embodiment of the present invention.

FIG. 4 is a connection sequence diagram of a QoS flow. As shown in FIG. 4, in step S10, the user terminal 220 transmits a connection request to the radio communication terminal 210 for executing file transfer from the web server 420.

In step S20, the radio communication terminal 210 is executes radio section setting (Air Connection Setup) with the PDSN 130 on the basis of the received connection request.

In step S30, the PDSN 130 transmits a connection request to the web server 420.

In step S40, the web server 420 transmits a response to the connection request to the user terminal 220.

In step S50, the user terminal 220 issues a request to set a flow priority (QoS setting) to be applied to the file transfer from the web server 420.

In step S60, the radio communication terminal 210 executes QoS setting (QoS Setup) with the BTS/PCF 120 on the basis of the received request for QoS setting.

In step S70, the radio communication terminal 210 executes QoS setting (QoS Setup) with the PDSN 130 as well on the basis of the received request for QoS setting.

In step S80, the PDSN 130 transmits a request for QoS setting to the web server 420.

In step S90, the web server 420 transmits information indicating completion of the QoS setting to the user terminal 220.

In step S100A, the user terminal 220 and the radio communication terminal 210 execute connection of the QoS flow F2. Likewise, in step S100B, the radio communication terminal 210 and the PDSN 130 also execute connection of the QoS flow F2. Moreover, in step S100C, the PDSN 130 and the web server 420 also execute connection of the QoS flow F2.

(2) Assignment Process

Figure 5:
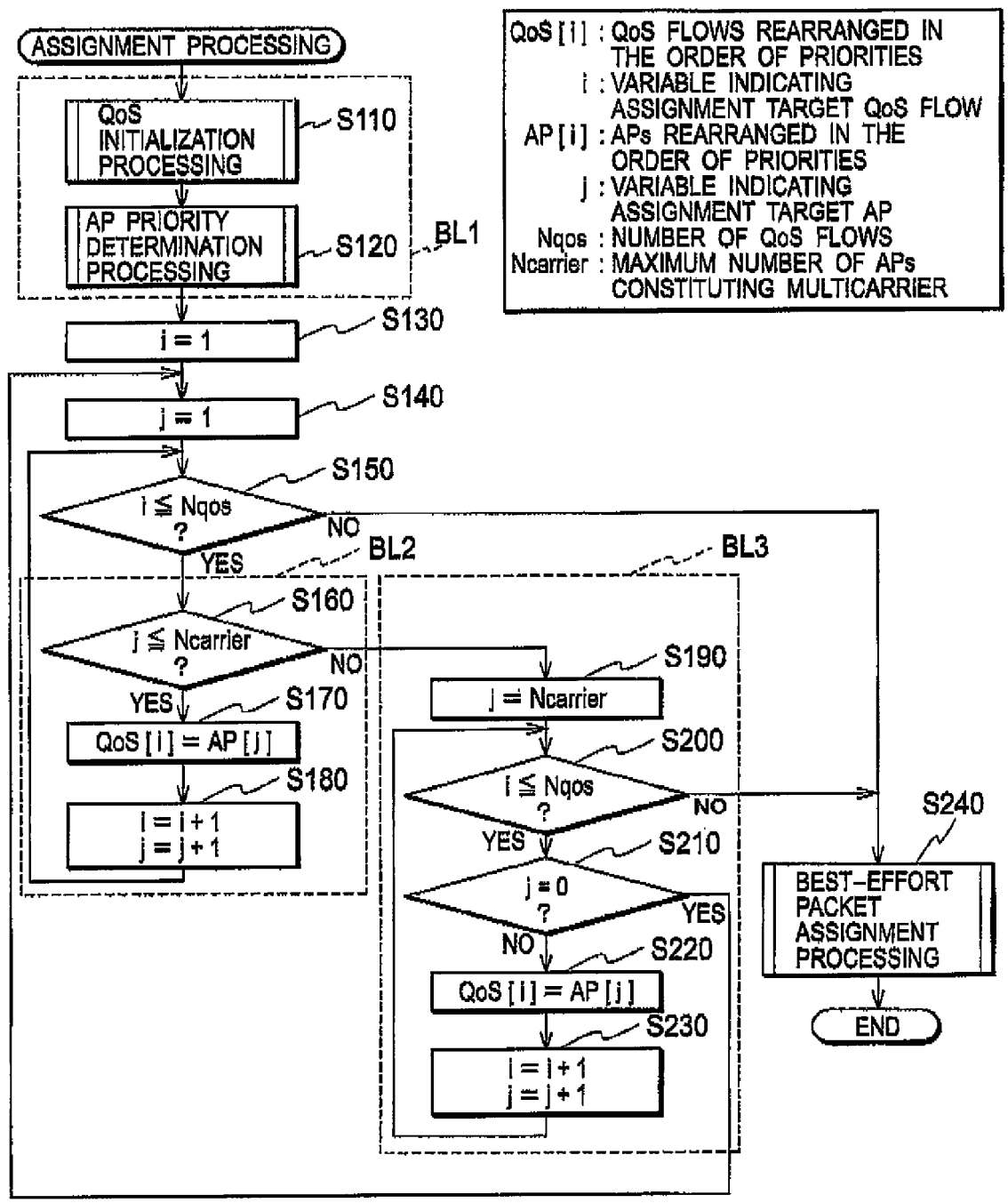
FIG. 5 is a diagram showing a processing flow of carrier assignment to a QoS flow according to the embodiment of the present invention.

FIG. 5 shows an assignment process flow of a carrier to a QoS flow. The assignment process flow can be separated into processing of blocks BL1 to BL3 and step S240.

(2.1) Entire Process Flow

In step S110, the communication control system 100 executes a QoS initialization process. The contents of the QoS initialization process will be described later.

In step S120, the communication control system 100 executes AP priority determination processing. The contents of the AP priority determination processing will be described later.

In step S130, the communication control system 100 sets a variable (i) indicating any one of assignment target QoS flows to "1."

In step S140, the communication control system 100 sets a variable (j) indicating any one of assignment target carriers (APs) to "1."

In step S150, the communication control system 100 determines whether or not the variable (i) of the assignment target QoS flow is equal to or greater than the number of QoS flows (Nqos).

If Nqos is equal to or greater than i (YES in step S150), the communication control system 100 determines in step S160 whether or not the maximum number of APs (Ncarrier) that can be used as a multicarrier is equal to or greater than the variable (j) indicating the assignment target AP.

If Ncarrier is equal to or greater than j (YES in step S160), the communication control system 100 assigns one of QoS flows rearranged in the order of descending flow priorities In this embodiment, the QoS flow F1 of a higher flow priority is assigned to the AP (specifically, the carrier C1) first. The QoS flow F2 is assigned to the carrier C2, thereafter.

In step 8180, the communication control system 100 adds "1" to the variables (i) and (j).

If Ncarrier is less than j (NO in step S160), the communication control system 100 changes the value of the variable (j) to the value of Ncarrier in step S190.

In step S200, the communication control system 100 determines whether or not the number of assignment target QoS flows (Nqos) is equal to ox greater than the variable (i) indicating any one of the assignment target QoS flows.

If Nqos is equal to or greater than i (YES in step S200), the communication control system 100 determines in step S210 whether or not the variable (j) indicating the assignment target AP is "0."

If j is not equal to 0 (NO in step S210), the communication control system 100 assigns QoS flows rearranged in the order of descending flow priorities (QoS[i]) to AP (AP[j]) in step S220.

If j is equal to 0 (YES in step S210), the communication control system 100 repeats the processing from step S40.

In step S230, the communication control system 100 adds "1" to the variables (i) and (j) and repeats the processing from step S200.

If Nqos is less than i (NO in step S150, NO in step S200), the communication control system 100 executes the assignment processing of a best-effort packet in step S240.

(2.2) QoS Initialization Processing

Figure 6:
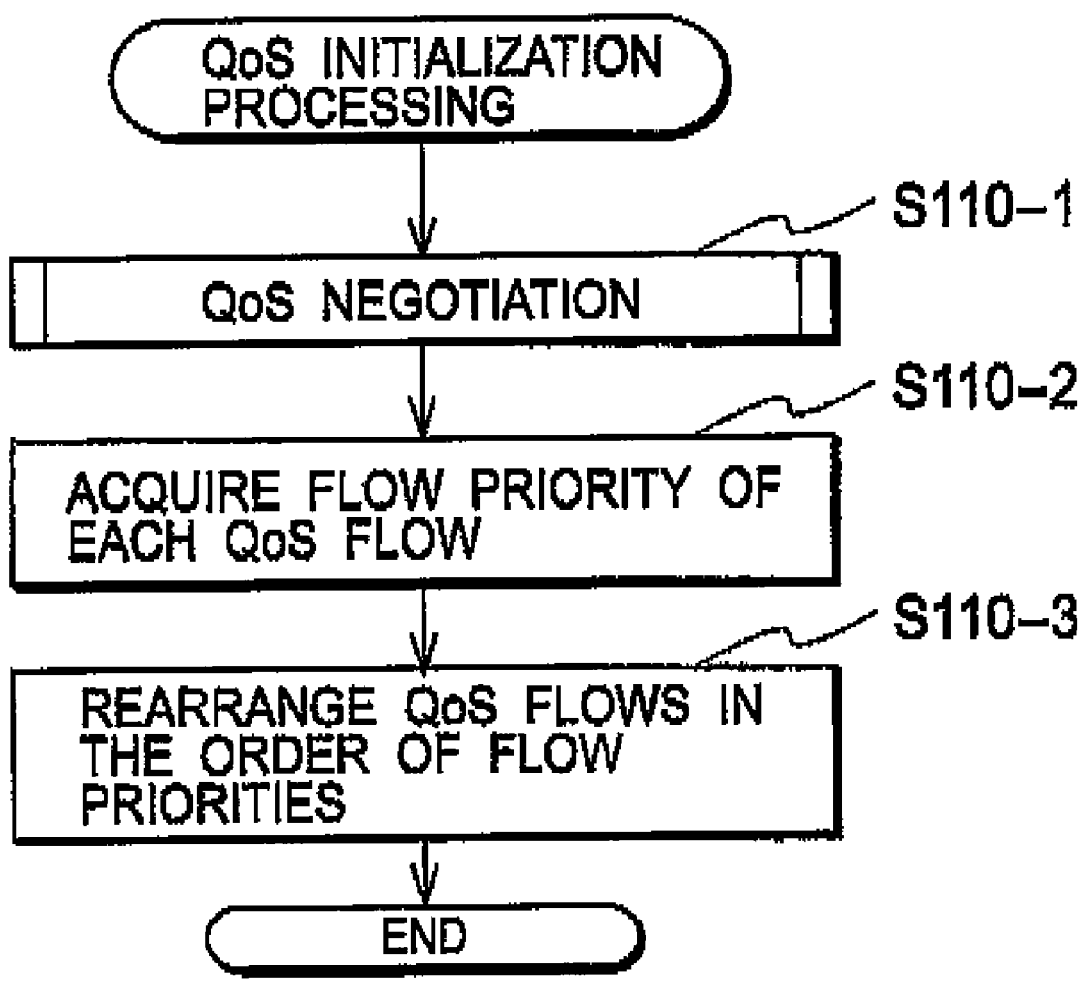
FIG. 6 is a diagram showing a QoS initialization processing flow according to the embodiment of the present invention.

FIG. 6 shows a QoS initialization processing flow. As shown in FIG. 6, the communication control system 100 executes QoS negotiation in step S110-1. Specifically, a flow priority is determined depending on a type of data to be transmitted.

Specifically, the flow priority of data to be transmitted is determined with reference to information shown in FIG. 10. In this embodiments the flow priority of the QoS flow F1 including the voice data D1 is set at "04" (the highest). In addition, the flow priority of the QoS flow F2 including the file data D2 is set at "01" (the lowest).

In step S110-2, the communication control system 100 acquires determined flow priorities of QoS flows.

In step S110-3, the communication control system 100 rearranges the QoS flows in the order of descending flow priorities and generates QoS[i].

(2.3) AP Priority Determination Processing

FIGS. 7(a) to (c) show three types of AP priority determination processing flows. In this embodiment, an AP priority is determined on the basis of a received signal strength (FIG. 7(a)), a receiving error rate (FIG. 7(b)) and a transmission delay time (FIG. 7(c)).

(2.3.1) Received Signal Strength

Figure 7:
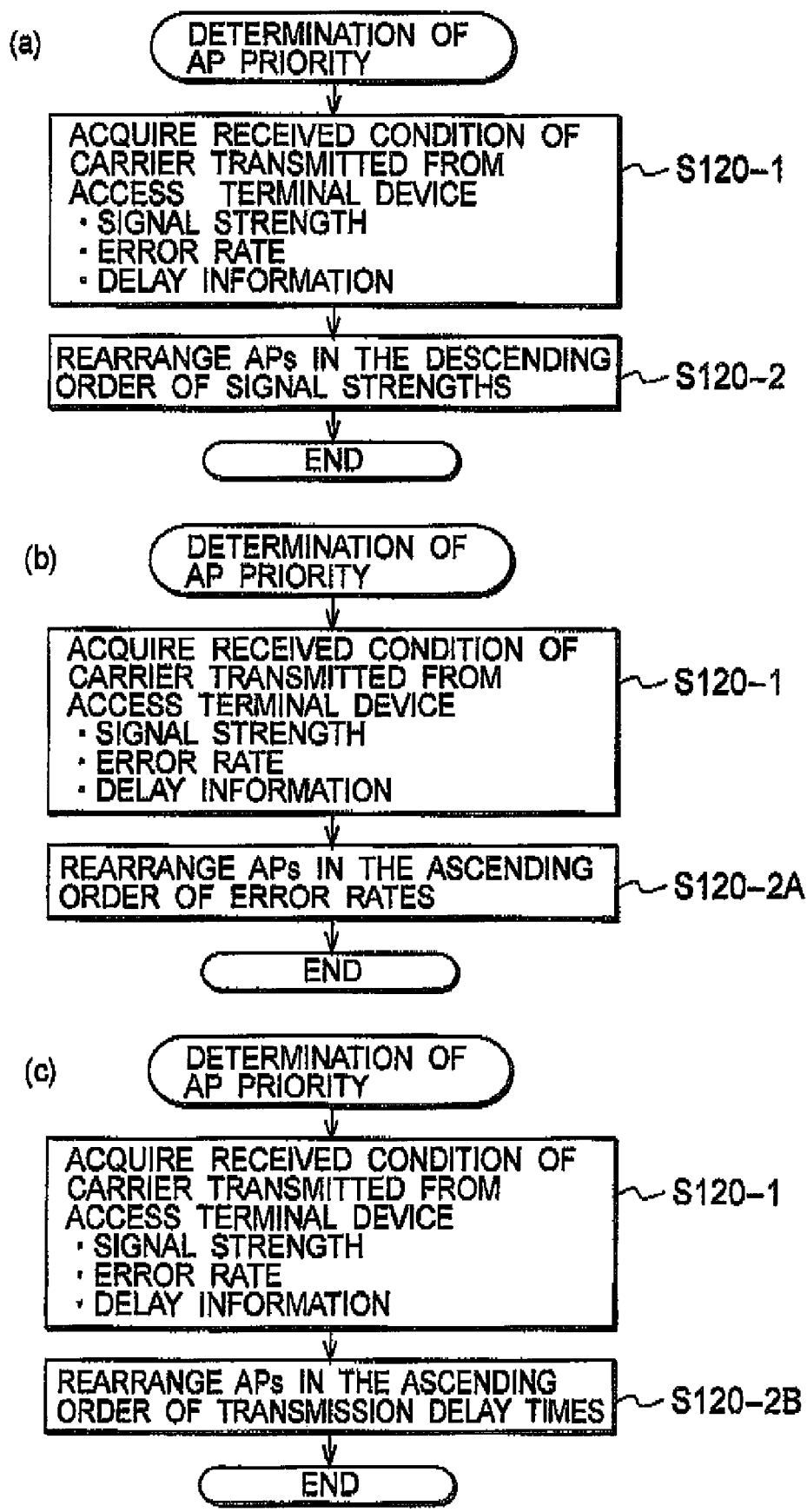
FIG. 7 is a diagram showing an AP priority determination processing flow according to the embodiment of the present invention.

As shown in FIG. 7 (a), in step S120-1, the communication control system 100 acquires information indicating a receiving condition of a carrier transmitted from the access terminal device 200.

Specifically, the communication control system 100 acquires a received signal strength (RSSI) of the received carrier, an error rate of data included in the carrier and delay information on the data.

In step S120-2, the communication control system 100 rearranges APs in the descending order of the signal strengths and then generates AP[j].

(2.3.2) Error Rate

In FIG. 7(b), processing of steps S120-2A is executed instead of the processing of aforementioned step S120-2. In this step, the communication control system 100 rearranges APs in the ascending order of the error rates and then generates AP[j].

Specifically, the carrier assignment unit 127 of the communication control system 100 (refer to FIG. 2) is allowed to determine a carrier to be assigned to a QoS flow on the basis of an error rate determined by the communication quality measurement unit 125.

(2.3.3) Transmission Delay Time

In FIG. 7(c), the processing of step S120-2B is executed instead of the processing of aforementioned step S120-2. In to this step, the communication control system 100 rearranges APs in the ascending order of the transmission delay time and then generates AP[i].

In other words, the communication control system 100, is that is, the carrier assignment unit 127 (refer to FIG. 2) is allowed to determine a carrier to be assigned to a QoS flow on the basis of delay information measured by the communication quality measurement unit 125, that is, a transmission delay time.

Incidentally, the transmission delay time may be an absolute transmission delay time or a relative transmission delay time from a reference transmission time of predetermined data.

(3) Assignment Processing of Best-Effort Packet

FIGS. 8(a) and (b) show two types of assignment processing flows of a best-effort packet. In this embodiment, executed are a method of assigning a data flow of the lowest flow priority (best-effort packet) evenly to each AP (carrier) (FIG. 8(a)) and a method of assigning a best-effort packet preferentially to an AP to which a QoS flow is not assigned (FIG. 8(b)).

(3.1) Method of Assigning Best-Effort Packet Evenly to Each AP

As shown in FIG. 8(a), the communication control system 100 assigns a best-effort packet substantially evenly to each AP (carrier) in accordance with the value of Ncarrier in step S240-1.

(3.2) Method of Assigning Best-Effort Packet Preferentially to AP to Which QoS Is Not Assigned As shown in FIG. 8(b), the communication control system 100 determines in step S240-11 whether or not the value of Ncarrier is greater than the value of Nqos.

If the value of Ncarrier is greater than the value of Nqos (YES in step S240-11), the communication control system 100 assigns in step S240-12 a best-effort packet substantially evenly to remaining APs to which QoS flows are not assigned (the number of APs equal to Ncarrier–Nqos)

On the other hand, if the value of Ncarrier is equal to or less than the value of Nqos (NO in step S240-11), the communication control system 100 assigns a best-effort packet substantially evenly to each AP in accordance with the value of Ncarrier in step S240-13.

(4) Re-execution of Assignment Processing

Figure 9:
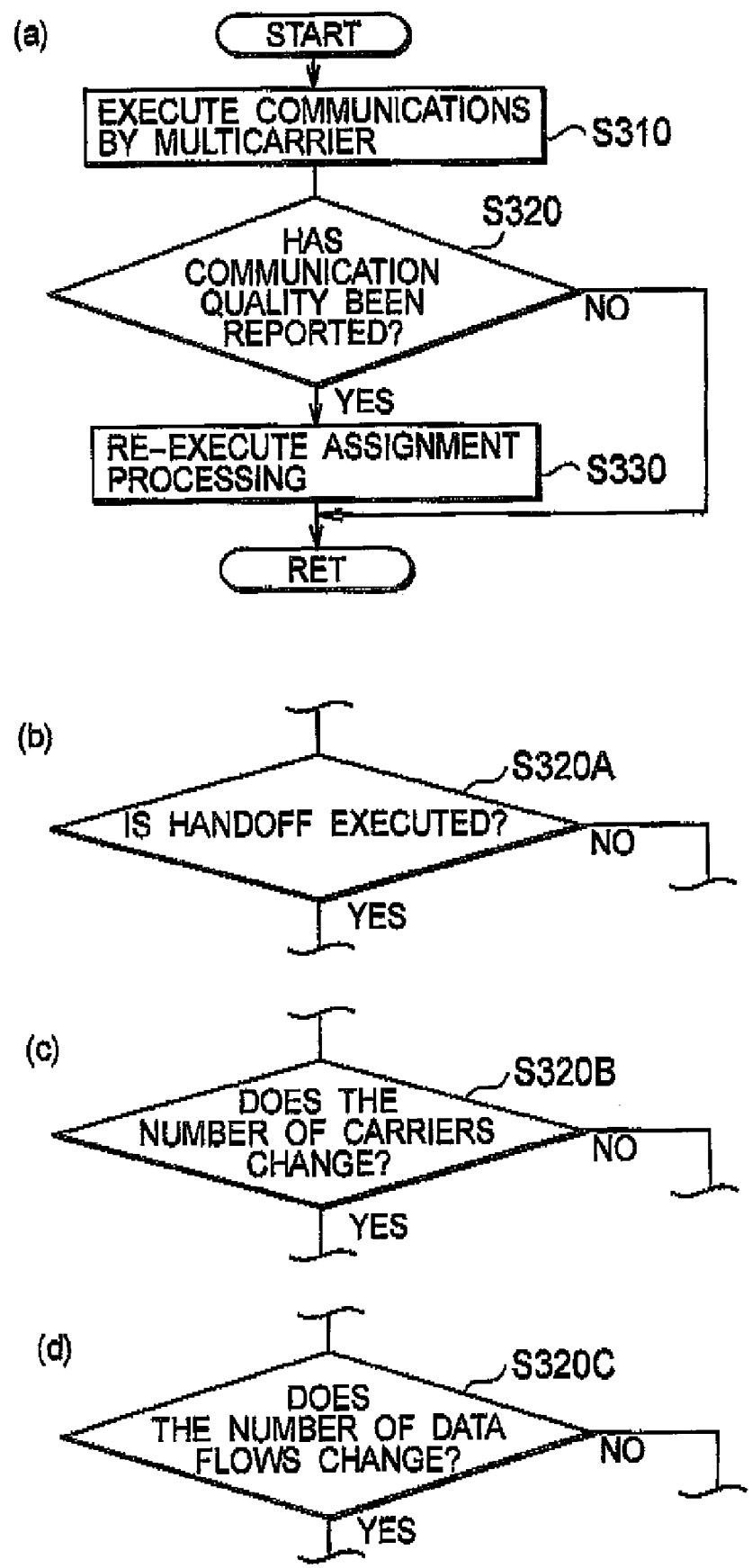
FIG. 9 is a diagram showing an operation flow in a case where the carrier assignment processing according to the embodiment of the present invention is re-executed.

FIG. 9(a) shows an operation flow in a case where the carrier assignment processing shown in FIG. 5 is re-executed. As shown in FIG. 9(a), in step S310, the communication control system 100 executes communications by a multicarrier (3×) after executing the carrier assignment shown in FIG. 5.

In step S320, the communication control system 100 determines whether or not a communication quality has been reported. Specifically, the carrier assignment unit 127 determines whether or not a communication quality has been newly so reported by the communication quality measurement unit 125 as to a carrier being used for the communications.

If a communication quality has been reported (YES in step S320), the communication control system 100 re-executes the carrier assignment processing shown in FIG. 5 in step 5330.

Specifically, when newly receiving a communication quality (signal strength, for example) reported by the communication quality measurement unit 125 after assigning a carrier to a QoS flow, the carrier assignment unit 127 determines again a carrier to be assigned to the QoS flow on the basis of the new communication quality.

In addition, the communication control system 100 is also allowed to execute the processing of steps S320A to S320C instead of the processing of step S320.

Specifically, the communication control system 100 performs the processing when a handoff of the radio communication terminal 210 is executed (step S320A of FIG. 9(b)), when the number of carriers used in communications changes (step S320B of FIG. 9(c)) and when the number of QoS flows changes (step S320C of FIG. 9(d)).

Specifically, after assigning a carrier to the QoS flow, the carrier assignment unit 127 is allowed to determine again a carrier to be assigned to a QoS flow by re-executing the carrier assignment processing shown in FIG. 5 in either case where (1) a handoff of the radio communication terminal 210 is executed, (2) the number of carriers used in communications with the radio communication terminal 210 changes, or (3) the number of QoS flows transmitted and received to and from the radio is communication terminal 210 changes.

Note that the carrier assignment unit 127 is allowed to determine a carrier to be assigned to the QoS flow again at a predetermined timing (for example, at each Tapupdate) rather than the aforementioned timing.

(Effects and Advantages)

According to the present embodiment described so far, a carrier (the carrier C1) different from that for a different data flow (for example, the QoS flow F1) of a flow priority different from that of the different data flow (for example, the QoS flow F2) on the basis of the flow priority of each of the QoS flows.

Accordingly, even if a trouble occurs in a part of carriers constituting the multicarrier (for example, the carrier C2), it is possible to avoid the interruption of all the data transmission. In addition, since QoS flows of different priorities are respectively allocated to different carriers, priority control of the QoS flows in accordance with the priorities can be more surely and easily achieved.

Moreover, according to the present embodiment, a carrier to be assigned to a QoS flow can be determined on the basis of a communication quality of the carrier. It is thus possible to assign a carrier having the best communication quality to a QoS flow of the highest priority, for example.

Furthermore, since a signal strength (RSSI), a transmission delay time of a QoS flow, and an error rate of a QoS flow can be used as the communication quality, an appropriate carrier in accordance with the characteristics of the QoS flow can be assigned, For example, a carrier having a small transmission delay time can be assigned to a QoS flow such as voice data that requires the transmission delay time to be small as an important condition. Moreover, a carrier having a low error rate can be assigned to a QoS flow that places importance on the communication speed (throughput).

(Other Embodiments)

As described above, although contents of the present invention are disclosed through an embodiment of the present invention, any description or drawing constituting a part of this disclosure should not be understood as limiting the present invention. Various alternative embodiments will be apparent from this disclosure to those skilled in the art.

For example, although the aforementioned embodiment employs the configuration of executing the process of measuring a communication quality of a carrier or the processing of to assigning a carrier in the communication control system 100, it is also possible to employ a configuration of executing the aforementioned processing in the radio communication terminal 210.

In this case, as shown in FIG. 3, the radio communication terminal 210 is configured to include the communication quality measurement unit 217 and the carrier assignment unit 219. The communication quality measurement unit 217 and the carrier assignment unit 219 provide substantially the same functions as the communication quality measurement unit 125 and the carrier assignment unit 127 of the BTS/PCF 120, respectively.

Although the communication quality measurement unit 125 and the carrier assignment unit 127 are included in the BTS/PCF 120 in the aforementioned embodiment, these components may be included in an access point.

In the aforementioned embodiment, the configuration in which the BTS/PCT 120 executes the measurement of a communication quality of a carrier is employed. Such measurement may be executed by the PDSN 130, however.

In the aforementioned embodiment, the multicarrier is configured by using three carriers by use of the access points 110A to 110C. The number of carriers, however, may be other than three (fifteen carriers, for example).

In addition, the radio communication terminal 210 may be a card type installable in a personal computer or a PDA. Moreover, the functions of the radio communication terminal 210 according to the present invention can be also provided as a radio communication module.

As described, the present invention also includes various embodiments and the like not described in this description as a matter of course. Accordingly, the technical scope of the present invention is only defined by the specific subject matters of the invention according to the scope of the invention as defined by the appended claims appropriate for this disclosure.

Note that the entire contents of Japanese Patent Application No. 2005-369840 (filed on Dec. 22, 2005) are incorporated in this description herein by reference.

Industrial Applicability

As has been described above, the communication control system, the radio communication terminal and the communication control method according to the present invention are capable of surely executing QoS control and also avoiding the interruption of all the data transmission even if a trouble occurs in a part of carriers in a case where multiple data of different priorities are transmitted by a multicarrier. The communication control system, the radio communication terminal and the communication control method according to the present invention are thus advantageous in radio communications such as mobile communications.

The invention claimed is:

1. A communication control system configured to transmit and receive a plurality of data flows having different priorities to and from a radio communication terminal by a multicarrier using a plurality of carriers, comprising:
   a carrier transmitter configured to transmit the carriers to the radio communication terminal; and
   a carrier assignment unit configured to assign each carrier different from that of other data flows to a data flow having a priority different from the other data flows, on the basis of the priorities of the respective data flows.

2. The communication control system according to claim 1, further comprising:
   a carrier receiver configured to receive the carriers from the radio communication terminal; and
   a communication quality measurement unit configured to measure communication quality of the carriers received by the carrier receiver,
   wherein the carrier assignment unit determines the carrier to be assigned to the data flow, on the basis of the communication quality measured by the communication quality measurement unit.

3. The communication control system according to claim 2, wherein the carrier assignment unit assigns a carrier having the best communication quality measured by the communication quality measurement unit to a data flow having the highest priority.

4. The communication control system according to claim 2, wherein
   the communication quality is a transmission delay time of the data flow, and
   the carrier assignment unit determines the carrier to be assigned to the data flow, on the basis of the transmission delay time measured by the communication quality measurement unit.

5. The communication control system according to claim 2, wherein
   the communication quality is an error rate of the data flow, and
   the carrier assignment unit determines the carrier to be assigned to the data flow, on the basis of the error rate measured by the communication quality measurement unit.

6. The communication control system according to any one of claims 2 to 5, wherein when receiving new communication quality reported by the communication quality measurement unit after assigning the carrier to the data flow, the carrier assignment unit determines the carrier to be assigned to the data flow again on the basis of the new communication quality.

7. The communication control system according to any one of claims 1 to 5, wherein the carrier assignment unit determines the carrier to be assigned to the data flow again when a handoff of the radio communication terminal is executed after the carrier is assigned to the data flow.

8. The communication control system according to any one of claims 1 to 5, wherein the carrier assignment unit determines the carrier to be assigned to the data flow again when the number of carriers used for the radio communication terminal changes after the carrier is assigned to the data flow.

9. The communication control system according to any one of claims 1 to 5, wherein the carrier assignment unit determines the carrier to be assigned to the data flow again when the number of data flows transmitted and received to and from the radio communication terminal changes after the carrier is assigned to the data flow.

10. A radio communication terminal configured to transmit and receive a plurality of data flows having different priorities to and from a radio base station by a multicarrier using a plurality of carriers, comprising:
    a carrier transmitter configured to transmit the carriers to the radio base station; and
    a carrier assignment unit configured to assign each carrier different from that of other data flows to a data flow having a priority different from the other data flows, on the basis of the priorities of the respective data flows.

11. The radio communication terminal according to claim 10, further comprising:
    a carrier receiver configured to receive the carriers from the radio base station; and
    a communication quality measurement unit configured to measure communication quality of the carriers received by the carrier receiver, wherein
    the carrier assignment unit determines the carrier to be assigned to the data flow, on the basis of the communication quality measured by the communication quality measurement unit.

12. The radio communication terminal according to claim 11, wherein the carrier assignment unit assigns a carrier having the best communication quality measured by the communication quality measurement unit to a data flow having the highest priority.

13. The radio communication terminal according to claim 11, wherein
    the communication quality is a transmission delay time of the data flow, and
    the carrier assignment unit determines the carrier to be assigned to the data flow, on the basis of the transmission delay time measured by the communication quality measurement unit.

14. The radio communication terminal according to claim 11, wherein
    the communication quality is an error rate of the data flow, and
    the carrier assignment unit determines the carrier to be assigned to the data flow, on the basis of the error rate measured by the communication quality measurement unit.

15. The radio communication terminal according to any one of claims 11 to 14, wherein when receiving new communication quality reported by the communication quality measurement unit after assigning the carrier to the data flow, the carrier assignment unit determines the carrier to be assigned to the data flow again on the basis of the new communication quality.

16. The radio communication terminal according to any one of claims 10 to 14, wherein the carrier assignment unit determines the carrier to be assigned to the data flow again when a handoff of the radio communication terminal is executed after the carrier is assigned to the data flow.

17. The radio communication terminal according to any one of claims 10 to 14, wherein the carrier assignment unit determines the carrier to be assigned to the data flow again when the number of carriers used for the radio communication terminal changes after the carrier is assigned to the data flow.

18. The radio communication terminal according to any one of claims 10 to 14, wherein the carrier assignment unit determines the carrier to be assigned to the data flow again when the number of data flows transmitted and received to and from the radio communication terminal changes after the carrier is assigned to the data flow.

19. The communication control system according to claim 1, wherein
the carrier transmitter transmits the carriers including first and second carriers to the radio communication terminal, and
the carrier assignment unit assigns the first carrier to a first data flow having a first priority, and assigns the second carrier to a second data flow having a second priority different from the first priority.

20. A communication control method for controlling transmission and reception of a plurality of data flows having different priorities by a multicarrier using a plurality of carriers, comprising the steps of:
assigning each carrier different from that of other data flows to a data flow having a priority different from the other data flows, on the basis of the priorities of the respective data flows; and
transmitting the carriers to a radio communication terminal.

* * * * *